United States Patent [19] McKeen et al.

[11] Patent Number: 4,992,778
[45] Date of Patent: Feb. 12, 1991

[54] PRE-FAILURE TENSION WARNING DEVICE

[75] Inventors: Robert G. McKeen, Albuquerque; Robert W. Spake, Placitas, both of N. Mex.

[73] Assignee: The University of New Mexico, Albuquerque, N. Mex.

[21] Appl. No.: 455,545

[22] Filed: Dec. 22, 1989

[51] Int. Cl.⁵ .................. G08B 21/00; G01L 5/04
[52] U.S. Cl. ................................ 340/668; 73/762; 73/862.45; 116/212; 116/DIG. 34; 340/685
[58] Field of Search ............ 340/668, 548, 571, 568, 340/677, 675, 685; 116/212, DIG. 34; 73/862.45-862.48, 762, 768; 200/61.14

[56] References Cited
U.S. PATENT DOCUMENTS

| | | | |
|---|---|---|---|
| 3,885,428 | 5/1975 | Dalferth | 116/DIG. 34 X |
| 3,910,224 | 10/1975 | Thompson et al. | 116/212 X |
| 3,918,301 | 11/1975 | Baer | 340/668 X |
| 4,245,139 | 1/1981 | Orscheln et al. | 340/668 X |
| 4,317,368 | 3/1982 | McElroy | 340/685 X |
| 4,509,376 | 4/1985 | Thomasson | 340/685 X |
| 4,571,582 | 2/1986 | Walter | 340/677 |
| 4,814,749 | 3/1989 | Abramson | 340/568 X |

Primary Examiner—Glen R. Swann, III
Assistant Examiner—Thomas J. Mullen, Jr.
Attorney, Agent, or Firm—Albert Sopp

[57] ABSTRACT

The invention provides a method and means for detecting and giving warning of a predetermined status of cordage through the change of a warning element from one condition to a different condition in response to a change in the status of the cordage.

11 Claims, 5 Drawing Sheets

FIG—1

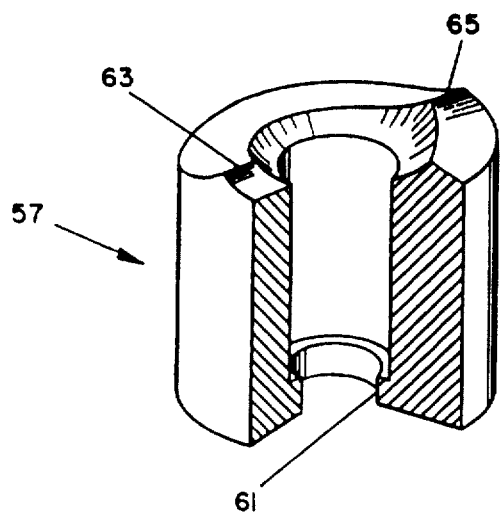
FIG—3
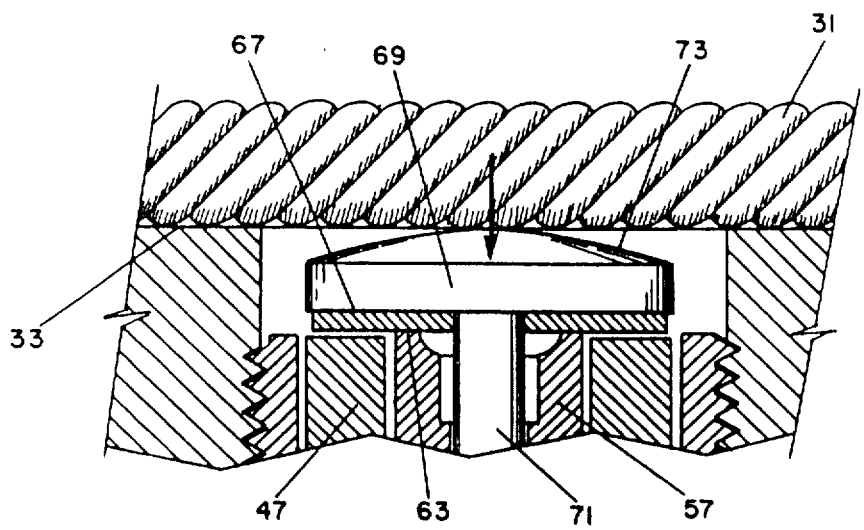
FIG—4
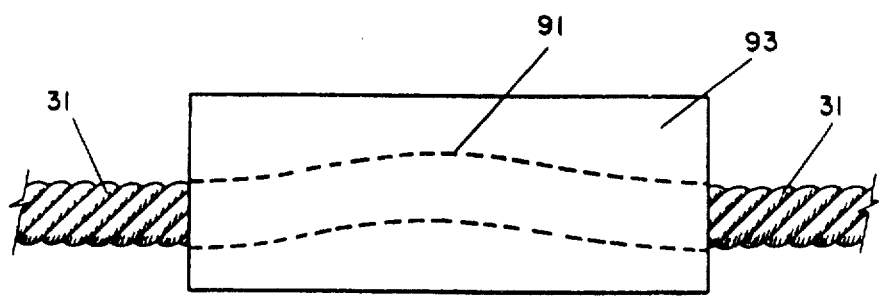
FIG—5

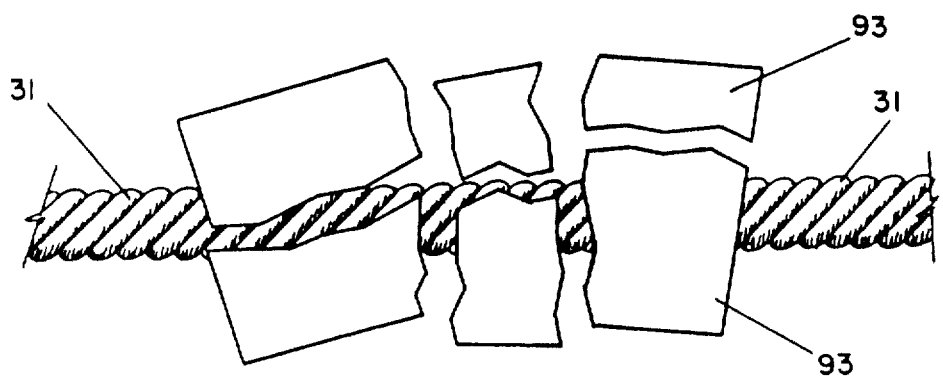
FIG—6
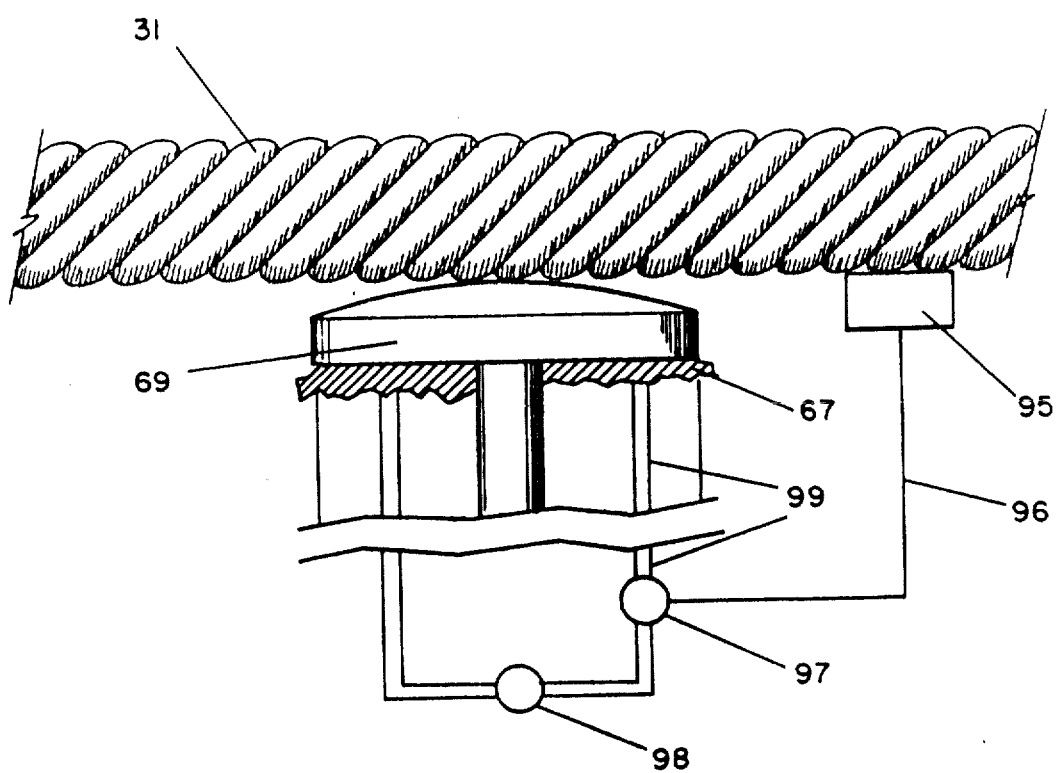
FIG—7

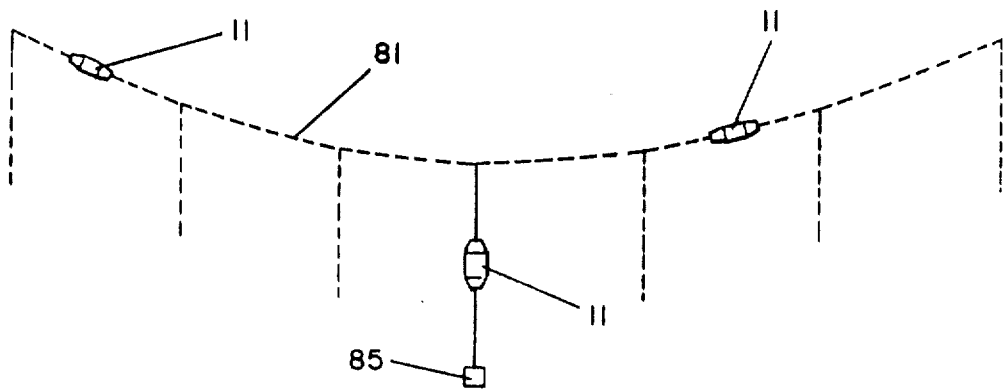
FIG—8
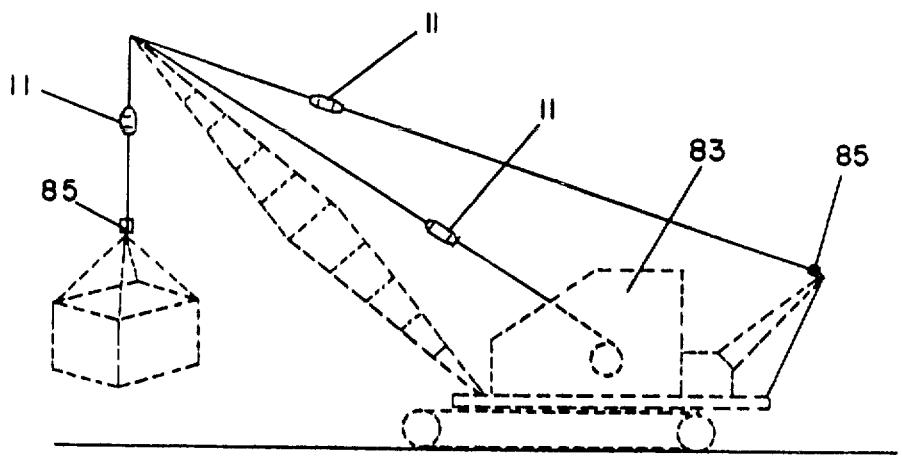
FIG—9

PRE-FAILURE TENSION WARNING DEVICE

BACKGROUND OF THE INVENTION

Failure of cables, wires, ropes, webbing (referred to herein as cordage) in lifting, supporting, guying, holding, or staying objects is a serious problem. Associated with the problem is the need to provide for operators of cordage equipment an adequate warning of impending failure of cable, wire, etc. when under tension or other potentially dangerous situations. In recent years various electronic devices have been introduced to provide such warning by determining potentially dangerous conditions such as overload due to stress or weight, but these rely on an uninterrupted source of electricity. Scales of various types have also been introduced into the load-cordage sequence to determine overload due to weight, but both of the above methods are invariably fragile, and both of these methods require frequent recalibration, are expensive, and are difficult for operators of equipment to continuously monitor. Also, the previous methods will not indicate other dangerous conditions including transients that may affect tension conditions in cordage.

Some manufacturers of webbing have attempted to resolve this problem by introducing vari-colored threads into the body of the webbing, which, when becoming apparent to the operator, indicate an overload condition. This, however, indicates an irreversible condition of overload, not a warning which allows one to proceed with caution after repair.

SUMMARY OF THE INVENTION

This invention relates to a pre-failure tension warning arrangement for cables, webbing, chain, rope, wire, and cordage of all types and materials. The invention provides a method and means for detecting and giving warning of a predetermined status of cordage through the change of a warning element from one condition to a different condition in response to a change in the status of the cordage.

According to an embodiment of the invention, a device is provided for positioning on cordage. Means are provided in the device so that it changes its position or condition when a certain percentage of the failure strength of the cordage has been reached or when a certain predetermined operating condition has been reached. In one form of the invention, a housing through which the cordage passes is positioned on the cordage. Inside the housing there is provided means including a plunger biased against the cordage distending it slightly. This tension holds the device in place on the cordage. There is also provided a deformable, rupturable, or shearable member which, when subjected to the tension caused by the bias, deforms, shears, ruptures or fails when a predetermined level of tension occurs on the cordage due to a predetermined amount of load. When this occurs, the device is no longer held in place on the cordage, and the device falls, providing visible indication of a pre-failure tension condition.

Thus, according to the invention there is provided warning when a percentage of a characteristic of the cordage such as the breaking strength of the cordage is reached. This loss is often of an unknown degree, but once it begins to occur, the cordage is much more liable to subsequent failure due to fatigue. Such cordage loses utility and should be replaced. The degree of loss is variable and is determined by the material and operating conditions which may depend on temperature, or, in some cases, pollutants. The timely knowledge that the loss of a critical or predetermined percentage of the working or failure strength of the cordage has in fact occurred is of enormous value in preventing failures of cordage with resulting loss of life, equipment, and/or property.

Among the objects of the present invention is to provide: A simple warning device which can be placed on cordage and left in place for indefinite periods without further checking, maintenance, or other concern; a pre-failure cordage warning device usable by unskilled personnel; a pre-failure cordage warning device which provides a highly visible (and, if desired, audible) physical means to surely indicate that a pre-set condition, indicative of a dangerous pre-failure load condition, has been reached; a pre-failure warning device which does not rely on any external source of power, which is also simple, rugged, and reusable even if operating conditions proceed to the ultimate failure of the cordage, and which does not need monitoring.

Still further objects and advantages of the present invention will appear from the more detailed description set forth below, it being understood that such detailed description is given by way of illustration and not by way of limitation.

BRIEF DESCRIPTION OF THE DRAWINGS

Reference is now made to the drawings in which clearances are exaggerated for clarity, like numerals refer to like parts, and in which:

FIG. 3 is a view of a die or cutting element in accordance with an embodiment of the invention which coacts with a deformable or shearable member to actuate the device of the invention; FIG. 4 is a view of a portion of FIG. 3 wherein the device of the invention is shown in its pre-failure tension warning position;

FIGS. 5, 6 and 7 are views of devices in accordance with other embodiments of the invention; and FIGS. 8 and 9 are views of systems or apparatus illustrating various uses of devices in accordance with the invention.

DETAILED DESCRIPTION

Figure 1:
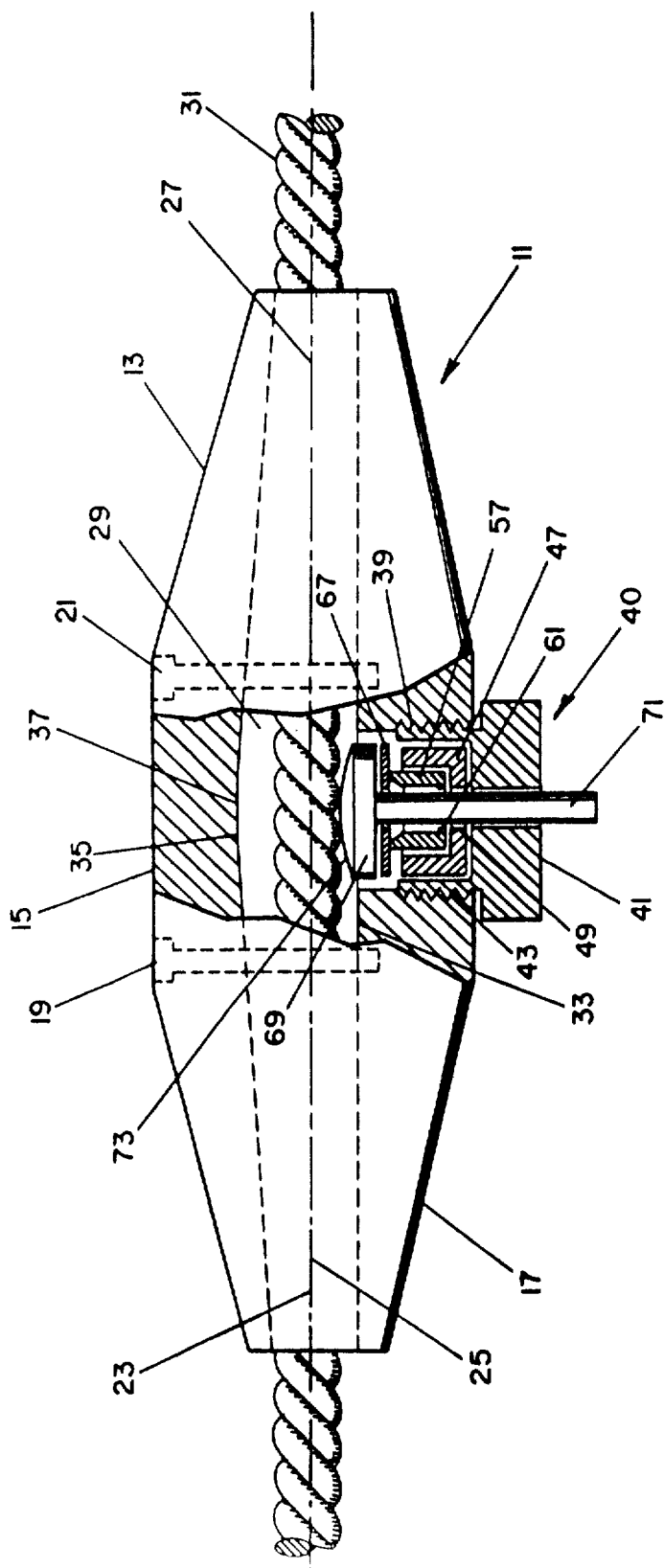
FIG. 1 is a view including a cutaway of a longitudinal section of a pre-failure tension warning device in accordance with an embodiment of the invention.

Referring to FIG. 1, there is provided in accordance with an embodiment of the invention a pre-failure tension warning device 11 having a generally cylindrical, elongated housing 13 which may have tapered ends as shown. The housing 13 is composed of a first body 15 and a second body 17 of similar shapes joined to each other by transversely oriented pairs of threaded bolts 19 and 21 extending through the body 15 into tapped holes in body 17. The bodies are joined at their respective opposing flat surfaces 23 and 25 in the plane of the housing's longitudinal axis or centerline 27.

The housing 13 has a central passageway or opening 29 extending longitudinally from one end of the body to the other through which cordage 31 such as wire rope, cable, etc. is passed. The central, longitudinal opening 29 is defined by a longitudinal, semicylindrical groove 33 axially located in body 17 and an axial, longitudinal groove 35 in body 15 juxtaposed with the groove 33

The groove 35 is tapered with its largest transverse cross sectional diameter or dimension 37 being at the longitudinal midportion of the housing 13. Thus, the central opening or passageway 29 is tapered to be substantially larger in its diametric or transverse dimension at midportion 37 than at its end portions.

Figure 2:
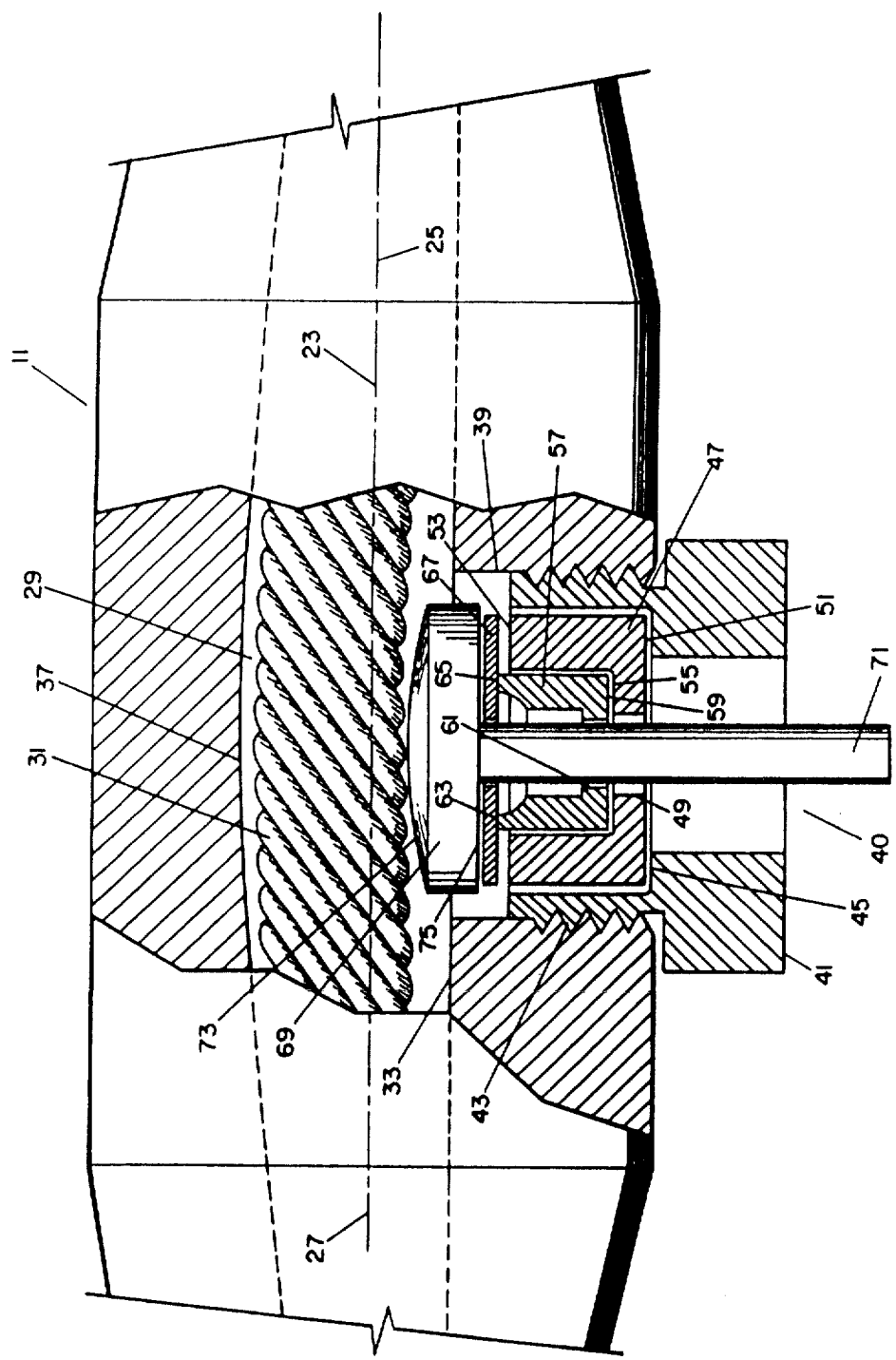
FIG. 2 is a view in greater detail of the device of FIG. 1.

Referring now to FIG. 2 (in which the sets of threaded bolts 19, 21 are not shown) as well as FIG. 1, the body 17 has a transverse threaded opening 39 drilled or cut therein in alignment with midportion 37 of central passageway 29. The opening 39 receives a sensing element 40 which has a hollow nut 41 threaded to fit into opening 39. The nut 41 has a threaded sleeve portion 43 and an interior transverse shoulder 45. A cup element 47 having a central opening 49 has a bottom portion 51 bearing against the shoulder 45 of the nut 41 and a top portion 53 coextensive with the sleeve portion 43 of the nut 41.

The cup element 47 has an interior shoulder 55. A cup-shaped die 57 fits in the cupped portion of the element 47 and has a bottom surface 59 which bears against the shoulder 55. The die 57 has an opening 61 in axial registry with the opening 49 of cup element 47.

Referring now also to FIG. 3, the upper end of the die 57 has cutting edges 63 and 65. These cutting edges bear against a washer 67 calibrated or designed in any suitable well known manner to be ruptured by the cutting edges 63, 65 when a predetermined amount of force is exerted to press the washer 67 against said edges. The design of such washers may be accomplished by laboratory testing of washers of given materials and dimensions so that a set of washers calibrated to rupture at various, different levels of force is available for use.

The sensor element 40 further includes actuating element or piston 69 with a shaft portion 71 which passes through the openings 49 and 61 of the cup element 47 and die 57 respectively and terminates at its radially inner end in a rounded head 73 for bearing against the cordage 31. The underside of the head has a flat surface 75 which bears against the washer 67.

With the device 11 positioned as shown in FIG. 1 to surround the cordage 31, as shown in FIG. 2 rotation of the nut 41 in sensor 40 causes the shoulder 45 to urge the cup element 47 against the die 57 which in turn forces the washer 67 to push the head 73 of the piston 69 against the cordage 31. This action locks the device into position on the cordage 31. It also places added tension on the cordage and, of course, distends it slightly off centerline or axis 27 so that it moves closer to the surface 25 at or near the midpoint 37 of the central opening 29.

Referring also to FIG. 4, when the tension on the cordage 31 reaches a predetermined level prior to actual failure of the cordage, said tension exerts a force in the direction shown by the arrow in FIG. 4 to thus press the washer 67 against the edges 63, 65 of the die 57. This causes the edges 63, 65 to pierce, rupture, or deform the washer 67, allowing the head 73 of the piston 69 to move out of the passageway 27 and, as shown in FIG. 4, allowing the cordage to return to its centerline position in the central opening 27. This action unlocks the device 11 from the cordage 31. If, as indicated in respective FIGS. 8 and 9, the device 11 is positioned on the cordage of a catenary 81 or a crane 83, the device 11 when unlocked will fall due to gravity and thus be easily observed. Of course, such event will alert the operators to the potentially dangerous condition of the cordage which, because of the predetermined level of tension imposed, should be checked and perhaps replaced.

As also indicated in FIG. 9, an indicating device 85 of any suitable well known construction may be placed at the bottom end of the cordage so that, when impacted by the device 11, it will sound an alarm, turn on a light, etc. Such an indicator is well known in the art and may simply comprise a light or siren in circuit with a battery and a switch which is closed when impacted by the device 11 when it falls.

Referring to the embodiment of FIGS. 5 and 6, the cordage 31 has a portion 91 which is pre-deformed or bent. This portion may be surrounded by and embedded in a castable plastic 93 such as methyl-methacrylate which becomes brittle when hard. When the cordage reaches a predetermined level of tension, then, as shown in FIG. 6, the cordage straightens out causing the plastic to visibly and audibly shatter, thereby providing warning. Also, this figure serves to illustrate another embodiment wherein the cordage is located underwater and the substance 93 is a sacrificial material such as zinc or a metal salt which disintegrates when the environmental conditions of the water such as chemical pollution negatively impact on the failure strength of the cordage. The fact of disintegration of the substance 93 such as zinc or a metal salt may be used to presage potential failure of the cordage.

In the embodiment shown in FIG. 7, a sensor such as a magnetic pickup 95 of any suitable well known design detects flow of electrical current in the cordage 31. Such flow may indicate a fault or potential fault condition of the cordage due to a change in its conductivity which presages a failure in the cordage. As shown in FIG. 7, a threshold device or logic circuit 97 of any suitable well known design may be triggered when the sensor 95 supplies via conduit 96 a signal of voltage or current exceeding a predetermined threshold. Threshold device 97 is also in circuit with a source of electrical power 98 such as a battery which supplies current to washer 67 in the device 11. When triggered, device 97 closes the circuit so that battery 99 supplies current to the washer 67 which may be of material that fuses or deforms in the presence of such current thereby permitting the piston 69 to be moved by the cordage 31 in the manner explained in connection with FIGS. 1 and 2.

It should be understood that any and all of the elements described herein may be of any suitable material depending on the type of cordage, the forces involved, and the environmental or ambient conditions. For example, if the cordage involves string for a kite, the device 11 may be composed of light wood or plastic elements, and the washer 67 of thin plastic material. Where the cordage is wire rope such as is found in construction cranes or in the rigging of sailing vessels, the elements should be of steel or other metals or alloys of substantial tensile strength. In situations involving high levels of tension and vibration in the cordage 31, it may be necessary to employ ancillary locking bolts or screws or any other suitable means well known in the art to lock the nut 41 securely in place. Any suitable well known means for locking screws in place may be employed.

What is claimed is:

1. A method of detecting and providing visible warning of a predetermined status of cordage comprising the steps of:

a. providing for attachment to the cordage a visible element in an intact condition related to a first level of status of the cordage, said intact condition being caused by a bend in the cordage produced and maintained by the attachment of the element thereto whereby said element imposes stress on the cordage, and b. permitting the intact condition of said element to visibly change to a different condition in response to a different level of status corresponding to the predetermined status of the cordage in which the bend is essentially straightened.

2. The method of claim 1 wherein the different condition includes partial destruction of the visible element.

3. A device for detecting and providing visible warning of a change in the status of cordage from a desired status to a predetermined potentially dangerous status comprising:
   a. body means in a visibly intact condition attached to said cordage;
   b. said body means including condition responsive means having an element imposing stress on the cordage to produce and maintain a bend in the cordage, said element being coupled to said body means to cause said body means to remain in said intact condition so long as said cordage continues to remain in a desired status and to cause said body means to visibly change into a different condition when the bend in the cordage straightens.

4. The device of claim 3 wherein said body means comprises first and second bodies and said condition responsive means comprises biasing means coupled to said first body, said body means further comprising means for attaching said first and second bodies to the cordage whereby said biasing means exerts a force against the cordage to produce a bend therein to thereby hold the body means in a position on the cordage, the force of said biasing means being overcome when the tension on the cordage reaches a predetermined potentially dangerous level to thereby detach the body means from the cordage and enabling said body means to freely move in relation to said cordage.

5. The device of claim 4 wherein said biasing means comprises a piston having a head portion for engaging the cordage, rupturable means abutting said piston and means for rupturing said rupturable means when said piston is caused by tension on the cordage to move the rupturable means against said means for rupturing.

6. A device for detecting and providing visible warning of a change in the status of cordage from a desired status to a predetermined potentially dangerous status comprising:
   a. body means in a visibly intact condition attached to said cordage;
   b. said body means including condition responsive means comprising means integral with said body means to thereby constitute an essentially unitary body, and wherein the device is attached to the cordage by virtue of the cordage having a bent portion embedded in said unitary body and held in said bent condition by the structural forces inherent in said unitary body, said unitary body being visibly changed in shape due to effects of ambient chemical substances on said unitary body whereby said change in shape presages tension of predetermined potentially dangerous level on the cordage.

7. The device of claim 6 wherein the change in shape of the unitary body is its partial destruction.

8. A method of detecting and providing visible warning of a predetermined status of cordage comprising the steps of:
   a. providing for attachment to the cordage a visible element in an intact condition related to a first level of status of the cordage, said intact condition being caused by a bend in the cordage produced and maintained by the attachment of the element thereto, and
   b. permitting the intact condition of said element to visibly change by virtue of a change in the position of the element on the cordage to a different condition in response to a different level of status corresponding to the predetermined status of said cordage.

9. The method of claim 8 wherein the change of position is due to forces acting naturally.

10. The method of claim 9 wherein the change of position is due to the force of gravity.

11. A device for detecting and providing a visible warning of a change in the status of cordage from a desired status to a predetermined potentially dangerous status comprising:
   a. body means in a visibly intact condition attached to said cordage;
   b. said body means including condition responsive means having an element for sensing an electrical characteristic of the cordage coupled to said body means to cause said body means to remain in said intact condition so long as said cordage continues to remain in a desired status and to cause said body means to visibly change into a different condition when the cordage reaches the predetermined dangerous status.

* * * * *